United States Patent [19]
Schwarz

[11] 3,883,127
[45] May 13, 1975

[54] BUFFER HAVING A BUFFER BODY OF FOAMED SYNTHETIC MATERIAL
[75] Inventor: Wilhelm Schwarz, Wilhelmshaven, Germany
[73] Assignee: Fried. Krupp Gesellschaft mit beschrankter Haftung, Essen, Germany
[22] Filed: Apr. 16, 1973
[21] Appl. No.: 351,504

[30] Foreign Application Priority Data
Apr. 22, 1972 Germany............................ 2219916

[52] U.S. Cl................ 267/140; 213/221; 293/71 R; 293/85; 293/88
[51] Int. Cl................................................ F16f 1/37
[58] Field of Search ........... 267/139, 140, 141, 136, 267/152, 153; 293/88, 85, 71 R; 213/221

[56] References Cited
UNITED STATES PATENTS
3,715,114   2/1973   Thorsby et al...................... 267/140
3,752,462   8/1973   Wight................................. 293/88

FOREIGN PATENTS OR APPLICATIONS
1,904,668   8/1970   Germany........................... 267/140

Primary Examiner—Evon C. Blunk
Assistant Examiner—Jeffrey V. Nase
Attorney, Agent, or Firm—Walter Becker

[57] ABSTRACT
A buffer having a buffer body of foamed synthetic material, e.g. polyurethane, which buffer body is at least on that side thereof which is exposed to heat covered by a mantle made of a good heat conducting material and adapted to follow the compression and expansion movement of the buffer body.

7 Claims, 4 Drawing Figures

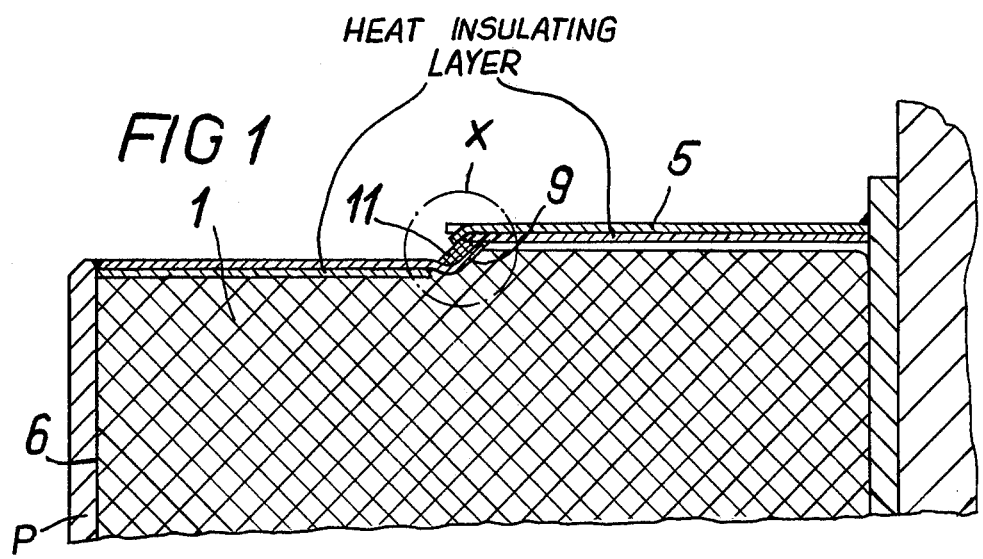
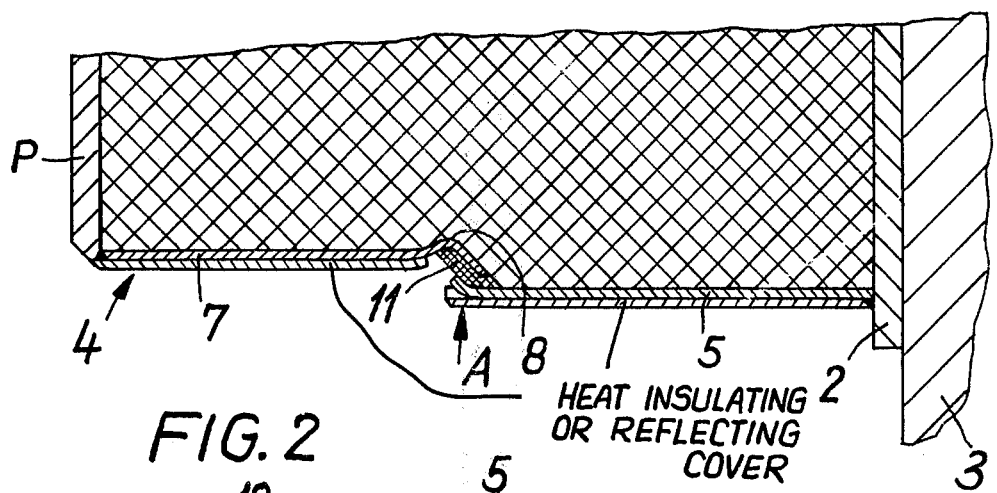
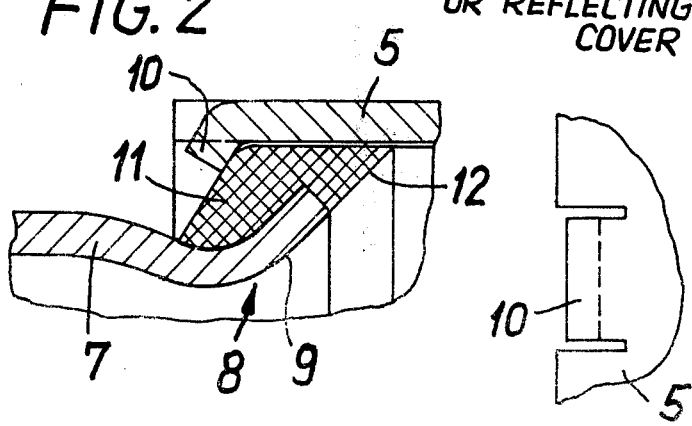
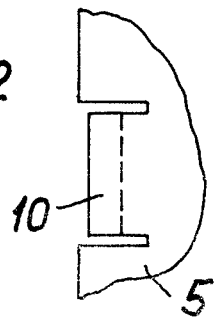

BUFFER HAVING A BUFFER BODY OF FOAMED SYNTHETIC MATERIAL

It is known to absorb shock energies by buffer bodies of foamed material as, for instance, cellular polyurethane. In many instances, for instance, when resilient end abutments are involved for oscillating arms, airplane tow bars or cable buffers, the cellular buffer body is fully enclosed in a mantle of sheet metal which also in relaxed condition of the buffer body projects beyond the surface thereof which is acted upon by the respective forces. The compression of the buffer body is effected by a piston immersing into said mantle. Such rigid enveloping of the elastic buffer body is effected for different purposes. On one hand, when subjected to pressure loads, the cross section of the elastic body is to be limited. Furthermore, it is intended that the mantle guide the immersing piston and eliminate the buckling danger when employing longer elastic buffer bodies. Furthermore, by enveloping the elastic buffer body, certain buffer characteristics can be realized. Such envelope also protects the buffer body against mechanical damage and also against chemical attacks.

If however, elastic cellular material is to be used for buffers of cranes and hoists, the buffer bodies are usually arranged free from supporting mantles. To protect such buffers against flying sparks, mechanical damage, and chemical attacks, the buffer bodies are covered by elastic skins. These skins, however, do not furnish sufficient protection against high heat loads, especially when buffers on cranes are employed which operate in the presence of considerable heat as is the case, for instance, with cranes used in connection with low furnaces. In view of the convective heat transfer of rising hot gases, and in particular in view of heat radiation, a horizontally arranged buffer body will be damaged at its bottom side, particularly within the region which extends on both sides of the vertical longitudinal central plane of the buffer body over center angles of the cross section of 45° each.

It is, therefore, an object of the present invention to provide a buffer body of cellular material which is simple in construction and is properly protected against harmful heat developments.

These and other objects and advantages of the invention will appear more clearly from the following specification in connection with the accompanying drawing, in which:

FIG. 1 is an axial section through a crane buffer according to the invention.

FIG. 1a is a slight modification of FIG. 1, inasmuch as the foamed material engages the mantle portion.

FIG. 2 illustrates on an enlarged scale that portion of FIG. 1 which is shown in a dot-dash circle indicated with the reference character X.

FIG. 3 illustrates on a larger scale than FIG. 1 a portion of FIG. 1 as seen in the direction of the arrow A.

The buffer according to the present invention is characterized primarily in that a mantle of good heat conducting material surrounds the buffer body at least on that side thereof which faces the heat, and also at least a portion of the surface of the buffer which is acted upon, while said mantle is so designed that it takes part in the changes in length of the buffer body which changes are brought about by buffer shocks and the subsequent relaxing of the buffer body. More specifically, the mantle of heat-conducting material which protects the elastic buffer body against harmful heat effects is able without difficulties and without being damaged to follow the movements of the buffer body when the latter is considerably compressed by the buffer shocks.

If the mantle is made up of two telescopically interengaged parts, the buffer body can be compressed to almost half of its installation length. However, it is also possible that two or more telescopically interengaging mantle portions and a mantle part fixedly connected with the steel construction of the crane or the like are provided. In such an instance, the buffer body can be compressed correspondingly more, for instance, to almost one-third or one-fourth of its installation length. The mantle preferably consists of metal such as steel or aluminum. The buffer body and accordingly the mantle have expediently the shape of a straight circular cylinder. However, also other desired cross sections may be selected.

The effect of the heat-conducting mantle is based on the fact that the heat which is locally absorbed at the mantle surface is, by conduction in the mantle, conveyed to the colder zones of the mantle and there is finally removed and conveyed to the surroundings. The thicker the cross section of the mantle, the less will be the heat resistance. On the other hand, also the heat capacity of the mantle increases, which fact is favorable when the heat load lasts only a short time. The sleeve-shaped mantle portions may, at the inner sides thereof, prior to the insertion of the elastic body be provided with a heat insulating layer in order to convey the heat flow in the mantle in the circumferential direction. Generally, however, this is not necessary, because in view of the thermal load of the cellular synthetic body, the latter will, within the region of the highest heat absorption of the mantle melt until a heat insulating air gap forms between the mantle and the cellular synthetic body, which gap will greatly block or reduce the further heat transfer between the mantle and the cellular synthetic body. The outer surfaces of the mantle may additionally be provided with a heat insulating and/or reflecting cover or coating. This means that the cellular synthetic body may be foamed directly into the mantle while the mantle serves as mold if, for reason of mechanical properites of the buffer no greater gap must be provided.

The telescopically displaceable mantle portion or each of a plurality of displaceable mantle portions is in the adjacent mantle portion not tightly guided so that angle errors which might occur in view of the inclined movement of the crane will not bring about automatic forces between the mantle sections. For this reason, a sealing ring of elastic wear-resistant material such as polyurethane or nylon is inserted in a considerable annular gap between the mantle sections. Expediently, the sealing ring is inserted or cast into a circular bead. In this way, the sealing ring is reinforced in axial direction. The said bead furthermore serves the purpose of lifting that mantle portion of the wall which during the compression of the buffer backs up. The mantle portion which comprises the bead immerses into the cellular synthetic material which backs up during the compression of the buffer. In this way it will be avoided that the cellular synthetic material jams between this wall and the sealing ring. To this end, the said bead has a deflecting surface which extends at an incline with regard to the buffer axis and which is preferably continued as a deflecting surface of the sealing ring.

Referring now to the drawing in detail, the buffer body 1 which consists of a foamed synthetic material, as for instance, polyurethane has a cellular structure with gas bubbles enclosed therein. The buffer body has the basic shape of a straight cylinder of circular cross section and has its rearward end face in engagement with a plate 2 which is mounted on the frame 3 of the crane. crane.

The mantle comprises two sections 4 and 5 of a good heat conductive material as, for instance, steel or aluminum. One mantle section 4 has a plate P which engages the surface 6 of the buffer body 1 which represents the surface over which the buffer body receives a shock or forces acting thereupon. The mantle section 4 furthermore comprises a cylinder 7 which is welded to the plate and which tightly surrounds the circumferential surface of the buffer body 1 and — in the illustrated relaxed condition of the buffer body — extends from the said surface 6 over half the length of the buffer body. The other mantle section 5 is welded to the plate 2. Its inner diameter is considerably greater than the outer diameter of the mantle section 4 so that when pushing the latter into the mantle section 5, between both there will be prevailing a considerable annular gap.

The marginal portion of the cylinder 7, which marginal portion immerges in the mantle section 5, is provided with a bead 8 which extends over the circumference of the cylinder. This bead 8 forms a depression in the buffer body 1 and widens subsequently to form a conical deflecting surface 9 toward the rear. The front rim of the mantle section 5 has one of its portions provided with inwardly bent-off ears 10. These ears support a ring 11 which is inserted into the bead 8 and consists, for instance, of polyurethane or nylon which is resistant against wear, and which tightly engages the inner surface of the mantle section 5. The ring 11 has a conical surface 12 which continues the deflecting surface 9.

By means of a buffer shock, the buffer body 1 is compressed while the mantle section 4 moves into the mantle section 5, if necessary up to the plate 2. The material of the buffer body which in radial direction is compressed up to the inner surface of the mantle section 5 is, by means of the deflecting surface 9 and the surface 12 of the ring 11 pressed inwardly away from the inner surface of the mantle 5 so that it will not be squeezed by the cylinder 7. In view of the elastic yieldability of ring 11 and also in view of the above mentioned annular gap, the mantle section 4 is able and without difficulties to assume an inclined position relative to the mantle section 5 when it is subjected to buffer shocks.

When subsequently the buffer body 1 relaxes, it returns the mantle section 4 into the starting position according to FIG. 1. A further forward movement is prevented by the fact that the ring 11 engages the ears 10 of the mantle section 5.

The buffer 1 can then by cementing, or the like, be connected to the plate 2 while rivet-shaped extensions of the buffer body are able to engage rearwardly pointing holes in plate 2. Under certain circumstances it is also possible that the buffer body 1 is not connected to plate 2, but instead, is held by the mantle sections 4 and 5. When the buffer body is composed of discs, these mantle sections may also serve for holding together the said discs.

When the buffer body 1, as mentioned, is formed by foamed synthetic material within the mantle parts 4 and 5 then serving as foaming molds, the foamed synthetic material will engage the inner surface of the mantle section 4, 5. In the modification of FIG. 1a, the engagement of the foamed synthetic material with the mantle section 5 is illustrated in contrast to the illustration in the modification of FIG. 1. When compressing the buffer body 1, the foamed synthetic material will then be pressed away from the mantle section 5. Furthermore, the foamed synthetic material will, when the mantle section 4 is moved in, slide on the inner surface of the mantle section 4. In order to assure that this sliding movement as well as the detachment of the foamed synthetic material from the inner surface of the mantle section 5 can be effected without damage, it is possible in conformity with the invention prior to the foaming step to deposit a separating substance upon the inner surfaces of the mantle sections 4, 5. It may be added that the mantle sections 4, 5 may consist of a metal, for instance, steel or light metal such as aluminum. The buffer body 1 consists, for instance, of a foamed synthetic material, for example polyurethane.

It is, of course, to be understood that the present invention is, by no means, limited to the particular showing in the drawing, but also comprises any modifications within the scope of the appended claims.

What I claim is:

1. A buffer which includes: a buffer body of foamed material having a first surface adapted to be acted upon by pressure, said buffer body being compressible in axial direction thereof by forces acting upon said first surface, mantle means of heat conductive material covering at least a portion of said buffer body and comprising a first section and a second section movable relative to each other in conformity with the compression and expansion of said buffer body which extends between both sections of the mantle means to substantially occupy space within one chamber, said first and second sections of said mantle means telescopically overlapping each other, end plate means respectively closing those ends of said telescopically interengaging mantle means which are remote from each other, said first and second sections overlapping each other with an angular gap therebetween, ring means radially interposed between said first and second sections and bridging the angular gap, at least one of said sections being provided with bead-depression means having said ring means located and secured therein, one of said sections adjacent its pertaining bead-depression means being provided with deflecting surface means for deflecting the foamed material of the buffer body in a direction radially inwardly from the outer one of said sections when said sections are being telescoped into each other.

2. A buffer according to claim 1, in which said mantle means are cylindrically extending around said buffer body.

3. A buffer according to claim 1, in which said ring means has a surface area forming an extension of said deflecting surface means.

4. A buffer according to claim 1, in which that end of said buffer body which is located opposite said first surface includes means for connection to a supporting body.

5. A buffer according to claim 1 which includes abutment means for limiting the telescopic movement of said first and second sections in conformity with the relaxing movement of said buffer body.

6. A buffer according to claim 1, in which said mantle means are provided with a heat insulating cover.

7. A buffer according to claim 1, in which said mantle means are provided with a heat reflecting cover.

* * * * *